United States Patent Office.

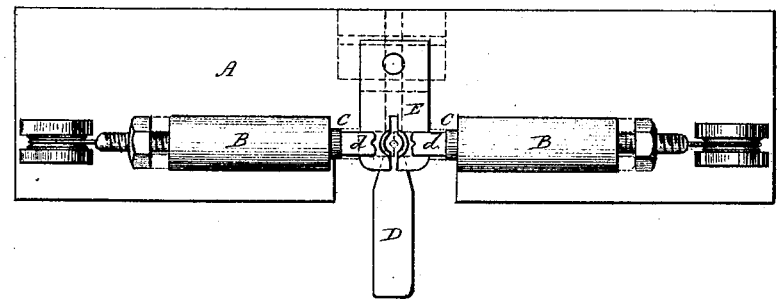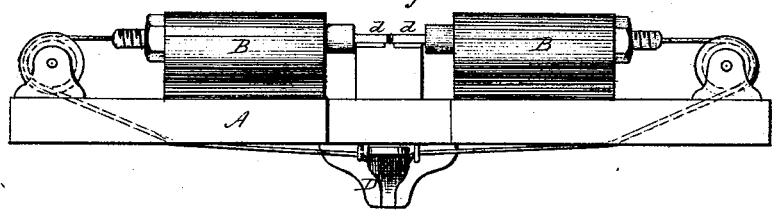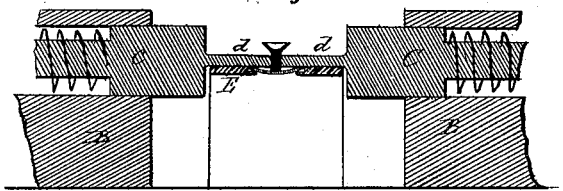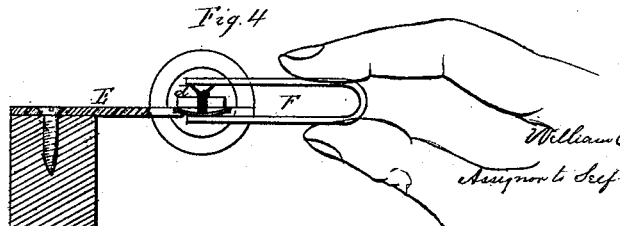

WILLIAM H. BLAKE, OF WATERBURY, CONNECTICUT, ASSIGNOR TO HIMSELF AND CHARLES M. MITCHELL, OF SAME PLACE.

Letters Patent No. 99,394, dated February 1, 1870.

IMPROVED APPARATUS FOR CENTRING SHANKS OR EYES IN BUTTONS.

The Schedule referred to in these Letters Patent and making part of the same

To all whom it may concern:

Be it known that I, WILLIAM H. BLAKE, of Waterbury, in the county of New Haven, and State of Connecticut, have invented a new Improvement in Apparatus for Centring Shanks or Eyes in Buttons; and I do hereby declare the following, when taken in connection with the accompanying drawings, and the letters of reference marked thereon, to be a full, clear, and exact description of the same, and which said drawings constitute part of this specification, and represent in—

Figure 1, a top view;
Figure 2, a front view;
Figure 3, a longitudinal section, enlarged;
Figure 4, a transverse central section; and in
Figure 5, the button-back, for the manufacture of which my invention specially relates.

This invention relates specially to the manufacture of backs of shirt-studs, for which Letters Patent were granted to me, November 23, 1869, but is alike applicable for centring the eyes or shanks of buttons generally.

I will first describe the stud or button-back, for the manufacture of which my invention specially relates, as shown in fig. 5.

$a$ is a disk, of metal, $b$, the shank, formed from wire or other suitable material, one end soldered to the disk $a$, and the other to be secured to the button.

In the manufacture of these backs, it is found very difficult to set the shank centrally on the disk and in a perpendicular position, and hold it in such position until soldered, a difficulty which, by my invention, is entirely overcome.

A is the bed-plate, upon which are fixed two heads, B B, and through which heads spindles C pass, longitudinally, so as to move axially to and from each other, and they are thus moved from each other, by means of a treadle, D, connected to each of the spindles, as seen in fig. 2, so that by depressing the said treadle, the two spindles are drawn apart, and by releasing the treadle, the spindles are returned, by springs within the heads, as seen in fig. 3, or otherwise.

The said spindles carry each a jaw, $d$, constructed to grasp the shank, as seen in fig. 3.

E is a plate, slotted, as seen in fig. 1, and so as to receive the disk, as seen in figs. 3 and 4.

To use the machine, the jaws are drawn apart, as seen in fig. 1, and the disk laid into a recess in the plate E, constructed so as to retain the said disk in a given position relatively to the jaws $d$, then the shank is placed on to the disk, and the jaws allowed to return and grasp the said shank, and hold it in a central position on the disk, as seen in fig. 3.

The workman then passes a suitable clamp, F, (see fig. 4,) on to the disk and over the end of the shank, which holds the two together, so that the jaws may be withdrawn, and, by the said clamp F, the disk and shank are removed from the machine and soldered together while held by the clamp, thus always maintaining the desired relative position of the two parts.

It will be readily seen, by those skilled in the art, that while this invention is described for the manufacture of backs for studs, it may, with equal facility, be used for centring the eyes of buttons, and for other like purposes.

I claim, as my invention—

The combination of the two jaws $d$ $d$, with the recessed and slotted plate E, constructed and operating substantially as described, so as to centre the shank upon the back, as set forth.

WILLIAM H. BLAKE.

Witnesses:
 GEO. E. TERRY,
 R. B. GWILLIM.